US011483205B1

(12) United States Patent
Jain et al.

(10) Patent No.: US 11,483,205 B1
(45) Date of Patent: Oct. 25, 2022

(54) DEFRAGMENTATION OF LICENSED RESOURCES IN A PROVIDER NETWORK

(71) Applicant: Amazon Technologies, Inc., Seattle, WA (US)

(72) Inventors: Ankit Jain, Seattle, WA (US); Murtaza Muidul Huda Chowdhury, Sammamish, WA (US); Srinivasan Ramkumar, Milpitas, CA (US); Anup P. Pandya, Milpitas, CA (US); Siddharth Padmanabhan Ramanarayanan, Mountain View, CA (US); Ramapulla Reddy Chennuru, Milpitas, CA (US); Niti S. Khadapkar, Union City, CA (US); Anupama Anand, Cupertino, CA (US); Jaco Joubert, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 16/908,170

(22) Filed: Jun. 22, 2020

(51) Int. Cl.
*H04L 41/0893* (2022.01)
*H04L 41/147* (2022.01)

(52) U.S. Cl.
CPC ........ *H04L 41/0893* (2013.01); *H04L 41/147* (2013.01)

(58) Field of Classification Search
CPC ... H04W 72/0453; H04W 24/02; H04W 4/38; H04B 17/318; H04B 17/23; H04B 17/27; H04B 17/309; H04B 17/3911; H04B 17/20; H04L 2209/38
See application file for complete search history.

(56) References Cited

U.S. PATENT DOCUMENTS

| 8,615,579 | B1* | 12/2013 | Vincent | G06F 9/4893 709/224 |
| 2010/0205303 | A1* | 8/2010 | Chaturvedi | G06F 21/10 709/226 |
| 2011/0010518 | A1* | 1/2011 | Kavuri | G06F 9/50 711/165 |
| 2013/0185420 | A1* | 7/2013 | Shimogawa | G06F 9/45558 709/224 |
| 2015/0026421 | A1* | 1/2015 | Nasu | G06F 3/0619 711/162 |
| 2017/0315838 | A1* | 11/2017 | Nidugala | H04L 67/1095 |
| 2019/0081924 | A1* | 3/2019 | White | H04L 61/1511 |
| 2021/0349767 | A1* | 11/2021 | Asayag | G06F 11/203 |

* cited by examiner

*Primary Examiner* — Michael A Keller
*Assistant Examiner* — Thao D Duong
(74) *Attorney, Agent, or Firm* — Nicholson De Vos Webster & Elliott LLP

(57) ABSTRACT

Techniques for automated defragmentation of licensed resources in a provider network are described. A defragmentation service in a provider network can detect the existence of intra-host fragmentation and/or inter-host fragmentation among host computing devices belonging to a host resource group of hosts dedicated to particular users. The defragmentation service can cause instances to be migrated to new locations within the host resource group to reduce or eliminate the fragmentation, allowing for hosts to beneficially be removed from the host resource group. The defragmentation service may determine which instances to be moved based on considerations involving software licenses associated with the host computing devices.

20 Claims, 10 Drawing Sheets

| ID 205 | NAME 210 | DESCRIPTION 215 | NUMBER OF LICENSES 220 | LICENSING METRIC 225 | METRIC TO LICENSE RATIO 230 | DAYS OF AFFINITY 235 | LIMIT 240 | ALLOWED TENANCY 245 | PRESERVE HISTORY 250 | RESOURCE IDS; USAGE 255 |
|---|---|---|---|---|---|---|---|---|---|---|
| ABCD1234 | WINDOWS SERVER ENTERPRISE LICENSES | LICENSING RULES DESCRIBING WINDOWS SERVER ENTERPRISE LICENSE AGREEMENT TERMS | 200 | PHYSICAL CORES | 1 | 90 | HARD | DEDICATED HOSTS | YES | I-129381 5<br>H-199121 2<br>MI-168246 1<br>... |
| DEFA5678 | SQL SERVER ENTERPRISE LICENSES | LICENSING RULES DESCRIBING SQL SERVER ENTERPRISE LICENSE AGREEMENT TERMS | 100 | VIRTUAL CPUS | 1 | 0 | HARD | ALL | YES | 5 |
| 1CCA2241 | VENDOR X VIDEO RENDERING LIBRARY LICENSES | LICENSING RULES DESCRIBING VENDOR X VIDEO RENDERING SOFTWARE LICENSE AGREEMENT TERMS | 10 | (<4 GPUS) / (CPU SOCKET) | 1 | 0 | SOFT | ALL | YES | 0 |

290 — ABCD1234 row
295 — DEFA5678 row
297 — 1CCA2241 row

*FIG. 2*

300

CREATE HOST RESOURCE GROUP

USE A HOST RESOURCE GROUP TO MANAGE HOSTS ASSOCIATED WITH YOUR SERVER-BOUND LICENSES

HOST RESOURCE GROUP DETAILS

HOST RESOURCE GROUP NAME

| MYGROUP1 |

DESCRIPTION

|          |

305

DEDICATED HOST AUTO-MANAGEMENT SETTINGS

☑ ALLOCATE HOSTS AUTOMATICALLY
☑ RELEASE HOSTS AUTOMATICALLY
☑ RECOVER HOSTS AUTOMATICALLY
☑ DEFRAGMENT HOSTS AUTOMATICALLY
  ☐ ENABLE AGGRESSIVE HOST RELEASE
    – *BEST WHEN LICENSES ARE NOT SCARCE; RESULTS IN LOWEST HOST UTILIZATION*

ALLOWED INSTANCE FAMILIES

| ALL ▼ |

310

315

ASSOCIATED LICENSE CONFIGURATIONS

LICENSE CONFIGURATIONS

| ABCD1234 – WINDOWS SERVER ENTERPRISE LICENSES ▼ |

320

[ CANCEL ]   [ CREATE ]

*FIG. 3*

DEFRAGMENTATION OF LICENSED RESOURCES IN A PROVIDER NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 2 is a diagram illustrating an exemplary data structure for storing license rules configurations and tracking license usage according to some embodiments.

FIG. 3 is a diagram illustrating an exemplary user interface for host resource group creation and auto-migration enablement for automated defragmentation of licensed resources in a provider network according to some embodiments.

DETAILED DESCRIPTION

Figure 1:
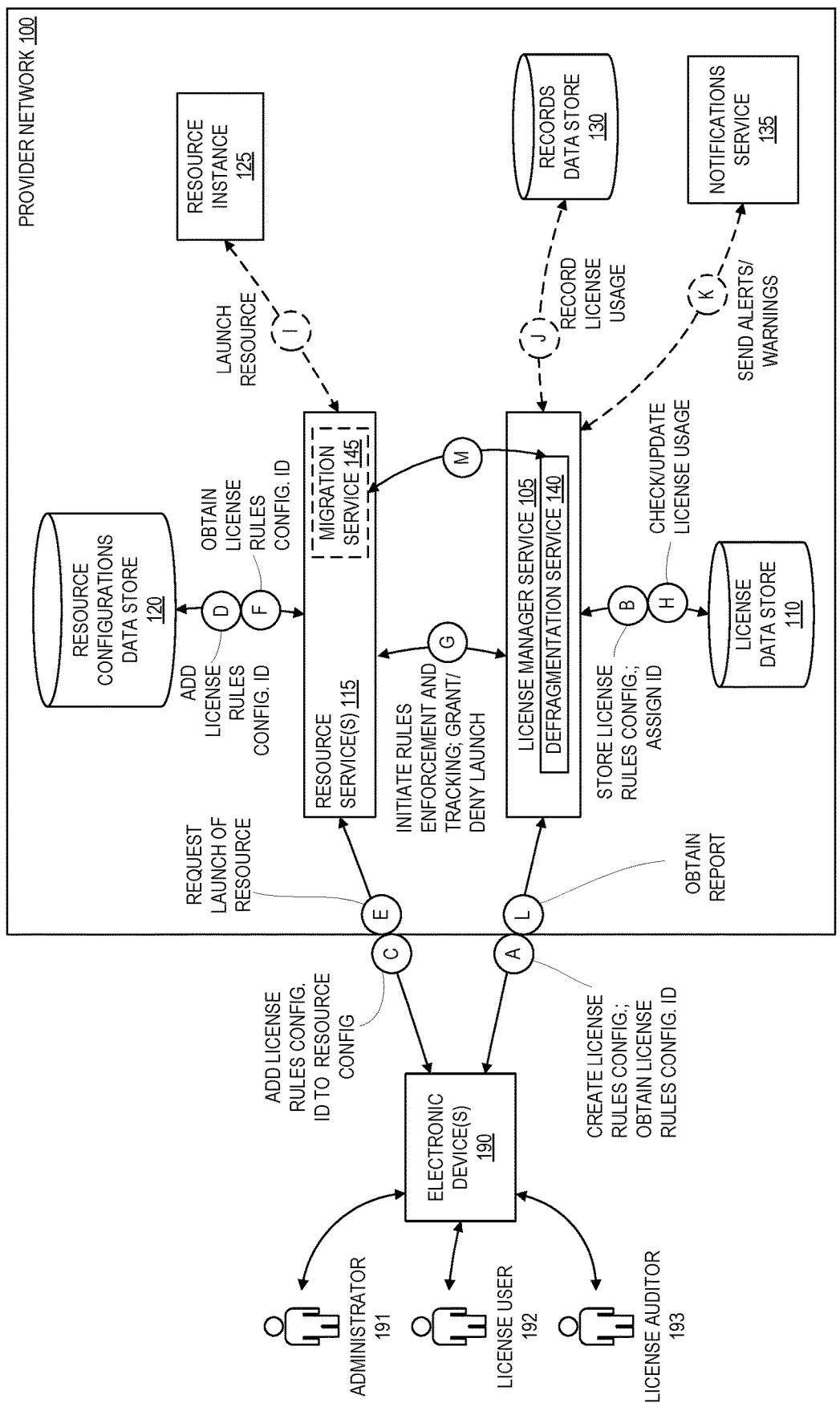
FIG. 1 is a diagram illustrating an environment for assigning and monitoring license usage associated with new resources according to some embodiments.

The present disclosure relates to methods, apparatus, systems, and non-transitory computer-readable storage media for automated defragmentation of licensed resources running on dedicated host computing devices in a provider network. Many servers ("hosts") in a cloud computing environment are virtualized, such that their compute capacity can be shared among different customers who each have access to a portion of the capacity. In contrast, a dedicated host refers to a physical server (in the cloud computing environment) that has its entire capacity dedicated to a single customer. Other customer's compute resources cannot be placed on a dedicated host, regardless of whether the customer to which it is dedicated fully utilizes its capacity. One example use case for such dedicated hosts is for hosting instances that run software which requires a host-bound license (e.g., the customer cannot move the software to a different host under the terms of their software license, and/or the customer licenses the entire host and can run as many copies of the software on that host as they are able).

According to some embodiments, a license manager service monitors resource utilization of host computing devices of a host resource group within a multi-tenant service provider network. The host resource group includes host computing devices that are dedicated for use by an account of the service provider network. The license manager service, in some embodiments, can detect an inter-host fragmentation condition when compute instances executed by a first host computing device could successfully be moved to one or more other host computing devices of the host resource group, allowing the first host computing device to be released from the host resource group. The license manager service, in some embodiments, can detect an intra-host fragmentation condition when compute instances executed by a first host computing device could successfully be moved to other locations on the same first host computing device to improve the amount of available contiguous instance slots on the first host computing device. In some embodiments, the license manager service may cause compute instances to be migrated from one location to another, within the host resource group, to address the fragmentation condition. The migration may be performed with minimal—or no—disruption to the execution of the compute instances, and may utilize reboot migration techniques, live migration techniques, or the like.

A license manager service (LMS) of a service provider network can enable its users to bring their own software licenses to the cloud or use licensed machine images provided by the provider network. Often, a license will include terms that require a user to license an entire server device, rather than just a compute instance like a virtual machine. For example, core-based licensing requires all physical cores in a server device to be licensed. Thus, a service provider network may allow its users to utilize such licenses by providing dedicated host computing devices that are reserved only for these users, which can then be used to launch one or more instances running programs that require such a license. The license manager service can help users by attaching licensing rules to an existing host computing device, or allow users to launch compute instances using a machine image that has an attached license such that the license is automatically attached to the host computing device.

For new launches of compute instances, these instances can be auto-placed on a suitably licensed host computing device. When a new host computing device is required in order to launch another instance that requires a particular license, the license manager service can automatically provision a new dedicated host computing device in the user's account, attach the required license, and launch the instance.

Over time, as users launch and terminate instances, multiple partially-filled host computing devices may exist having a same license policy attached. For example, as host computing devices become fragmented because of compute instance terminations, a user may have multiple host computing devices that are not utilized very well. As described herein, in some embodiments the license manager service can detect these conditions and can use migration (e.g., live migration) to consolidate instances on as few host computing devices as possible, allowing these hosts to be released and used for other productive purposes and/or users to reduce their management burden and cost associated with having extra dedicated hosts.

According to some embodiments, a provider network includes an LMS to help users of the provider network manage and track computer software and/or hardware licenses and usage of software and/or hardware under licenses. The LMS allows users to leverage existing licenses when using resources within the provider network to avoid the additional cost of obtaining additional, possibly duplicate licensing rights. The LMS can proactively enforce licensing rules to aid in license compliance for the user and/or send alerts relating to license usage or consumption to the user to reduce the risk of license overages and non-compliance. In addition, the LMS provides license usage reports to provide users with visibility into license usage and to comply with vendor audits.

Users of the provider network can model existing license agreements within the LMS using a licensing construct. The modeled license forms part of a license rules configuration that includes properties pertaining to the license, such as a user-specified metric that identifies how license consumption is measured, where the software can be run, a user specified-limit that identifies how much consumption is permitted, etc. When the user attempts to launch an instance of a resource, such as a compute instance (e.g., a virtual machine (VM)), a database instance having a particular software and hardware configuration, etc., the LMS tracks the consumption of any licenses associated with the software or hardware configuration and may, in some embodiments, allow or prevent the launch. For example, a user might have a license with a particular operating system software vendor that allows the user to use the software on ten separate processor cores. The user defines the license metric (e.g., processor cores) and limit (e.g., ten) with the LMS. When the user attempts to launch an instance of a resource that has a software configuration that includes the operating system software and an underlying hardware configuration with two processor cores, the LMS checks whether the license metric limit would be exceeded—e.g., whether the addition of two more physical cores (to be associated with the requested instance) would exceed the limit of ten (based on any existing instances that might be consuming the license). For example, if nine or ten cores were currently in use under the license, the addition of two more cores would cause the limit (of ten) to be exceeded and thus the LMS may deny the launch and alert the user of an overage. Alternatively, if eight or fewer cores were currently in use under the license, the addition of two more cores would not cause the limit (of ten) to be exceeded, and thus the LMS may allow the launch to occur.

FIG. 1 is a diagram illustrating an environment for assigning and monitoring license usage associated with new resources according to some embodiments. At a high level, the environment includes one or more resource services 115 and an LMS 105 that are part of a provider network 100. In some embodiments, the LMS 105 includes one or more application programming interfaces (APIs) that allow users and/or other components of the provider network 100 to communicate with the LMS 105. Users can create license rules configurations with the LMS 105 that specify the metric by which a license is consumed (e.g., central processing unit (CPU) sockets), a limit on license consumption (e.g., "5"), when or how the software associated with the license can be run (e.g., within a service provider environment or within a user operated location), etc. Leveraging a resource service 115 (e.g., a hardware virtualization service, a database service, etc.), users can create instances of computing-related resources that consume an amount of the specified metric (e.g., a two-socket server consumes two sockets of the available license limit), and the LMS 105 tracks this license usage.

The environment illustrated in FIG. 1 includes one or more electronic devices 190 in communication with a provider network 100. Communications between the electronic device 190 and the provider network 100 occur across one or more intermediate networks such as the Internet (not shown). Further, communications between the electronic device 190 and the provider network 100 may occur via one or more "frontend" services that are part of the provider network 100 (not shown) and that facilitate communications to "backend" services, which, in some embodiments, include the LMS 105 and/or the resource services 115. Exemplary frontend services may expose APIs to provide users with the ability to interact with the backend services. Interactions may occur via a web-browser based interface, a command-line interface (CLI), via software development kit (SDK) integration, etc. Other exemplary frontend services include access control services that verify the identity of a user and his or her associated permissions to access various computing-related resources within the provider network 100.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. Thus, such cloud provider networks provide services to multiple users, and thus may be referred to as being multi-tenant service provider networks.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

Note that the users of the provider network 100 may utilize one or more user accounts that are associated with a customer account (e.g., a business or organization may have a customer account that includes or is otherwise associated with multiple user accounts of potentially different types for its employees), though these terms may be used somewhat interchangeably depending upon the context of use. Thus, a customer may have or be associated with one or more user accounts (of one or multiple user accounts types) that are used by one or multiple users of the customer. Exemplary user types include license administrators 191, license users 192, and license auditors 193. In some embodiments, only the administrator 191 can create or modify license rules configurations with the LMS 105, either the administrator 191 or the license user 192 can instantiate resources within the provider network 100 that may require licenses, and the license auditor 193 may be limited to accessing records related to license usage; each scenario is described in greater detail below.

The resource services 115 provide users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing-related resources may be provided as services that allow a user to create instances of the underlying compute resource. One exemplary resource service 115 is a hardware virtualization service that allows users to create compute resource instances comprising one or more software programs executed by a particular hardware configuration, which may be actual or virtualized. Another exemplary resource service 115 is a database service that allows users to create database instances comprising one or more software programs, including database software, executed by a particular hardware configuration.

In some embodiments, a resource configurations data store 120 maintains resource configurations. Resource configurations can specify the hardware configuration and/or the software configuration for one or more resource instances that can be launched within the provider network 100. Exemplary resource configurations include instance types, machine images, launch templates, and formation templates. Instance types represent hardware configurations without specifying any particular software executed by the hardware. Machine images represent software configurations without specifying the underlying hardware in which the software is executed. For example, an instance type might specify a number of CPUs in a computer system, an amount of memory (e.g., random-access memory) in the computer system, and an amount of storage in the computer system (e.g., from a solid-state drive), while a machine image might specify an operating system and set of software programs that are executed within the operating system. Launch templates may specify both an instance type and a machine image, and formation templates may specify the instance type and machine image of multiple instances, including potentially additional intra-instance communication settings, etc. (e.g., virtual network configurations). Resource configurations data store 120 may be one or more storage locations within the provider network 100 that are accessible by one or more users (e.g., a public data store with pre-configured machine images, another public data store with pre-configured launch templates, a private data store with a specific user's formation templates, etc.).

In some embodiments, resource configurations have an associated set of properties that characterize the configuration. The properties associated with a resource configuration may be stored along with the resource configuration in the resource configurations data store 120 or associated with the resource configuration by the resource service 115. Properties may be implicitly or explicitly tied to a resource configuration. For example, a formation template might have an implicit property corresponding to an explicit property of an instance type included in the formation template. Exemplary properties associated with a software configuration include an identity of the software program(s), vendor(s), and version(s) of the included software (e.g., [{"Vendor":"Ubuntu", "Program":"Linux", "Version": "18.04"},{"Vendor":"Oracle", "Program":"Database", "Version":"12.1.0.1"}]).

A variety of properties can be used to characterize hardware configurations. Exemplary properties include performance properties such as by CPU clock speed, number of CPU cores, memory throughput (e.g., gigabytes (GB) per second), storage throughput, networking throughput, etc. Other exemplary properties include physical properties such as a type or number of CPUs, an amount of memory (e.g., random-access memory (RAM)), an amount or type of storage (e.g., solid-state drives), whether the instance includes dedicated accelerator hardware, the number of accelerators, etc. Additional properties associated with hardware configurations include whether the performance is in a virtual or physical computing environment (e.g., whether using virtualization technologies or running on a bare-metal computer system), whether the hardware configuration is dedicated to a particular user or shared amongst unrelated users, the location of the computer system (e.g., physically or logically, such as relative to other computer systems within a network or on a particular network). For example, in a shared, virtual hardware configuration, the performance properties might specify the number of virtual CPUs (vCPUs) and associated amount of memory accessible to the vCPUs associated with a single instance of the hardware configuration, of which the underlying physical hardware might be able to host up to four, eight, sixteen, or even more instances of the virtual configuration for different users.

An overall flow of assigning and monitoring license usage associated with new resources in the provider network 100 is outlined by the encircled letters "A" through "L" in FIG. 1. Circles A through D generally relate to creating license rules configurations; circles E through I generally relate to license consumption (e.g., when launching a resource instance); circles J through L generally relate to license usage monitoring; and circle M generally relates to fragmentation detection and defragmentation techniques.

At circle A, an administrator 191 can cause an electronic device 190 to send a message to the LMS 105 to create a license rules configuration. The message may be sent via a frontend interface (e.g., via a CLI, web-browser interface, SDK, etc.). In an exemplary embodiment, a license rules configuration includes various properties that can be used to represent an underlying license agreement and configure how the LMS 105 operates as part of monitoring license usage.

Exemplary properties may include one or more of the following:

Name: A user-specified name that can be used to identify the license.

Description: A user-specified description that can provide additional details regarding the license.

NumberOfLicenses: A user-specified value representing the number of licenses available under the license agreement.

LicensingMetric: A user-specified metric by which licenses are consumed under the license agreement. Exemplary metrics include performance metrics (that relate to the hardware configuration parameters described above) or other forms of metering found in license agreements, such as physical processor sockets (e.g., the physical interface between a CPU and a motherboard), physical computer systems (e.g., whether single- or multi-CPU coupled via a motherboard), virtual measurements (e.g., vCPUs), whether the computer system is within the provider network 100 or in some other location, etc. Metrics may be a single metric, as described above, or defined as a function of multiple metrics, such as a number of vCPUs allowed per physical socket or a number of instances allowed per physical computer system, etc.

MetricToLicensesRatio: A user-specified value representing a ratio that relates the LicensingMetric to the NumberOfLicenses (if different than 1). For example, if each license grant permits executing software on two cores, the value of MetricToLicensesRatio would be 2.

DaysOfServerAffinity: A user-specified value representing an amount of time that a license remains attached to a particular server device for server-bound licenses. Some licenses limit the frequency at which a software program can be moved between different compute resources (e.g., cannot be executed until 90 days after first being executed on a given server device).

AllowedTenancy: A user-specified property that indicates whether the licensed subject matter can be used on a system shared with other users or dedicated to a single user. Exemplary values include "Shared," "Dedicated," "Any."

UsageLimitType: A user-specified property that indicates to the LMS 105 whether it should limit new resource instance creation if a new resource instance would cause the NumberOfLicenses to be exceeded or otherwise violate the underlying license agreement.

PreserveHistory: A user-specified Boolean to indicate to the LMS 105 whether it should keep a license usage history.

PreserveHistoryLocation: A user-specified data store in which to store the license usage history (if PreserveHistory is true).

PreserveHistoryRetentionPeriod: A user-specified property representing an amount of time to retain the license usage history (e.g., 90 days).

PreserveHistoryFrequency: A user-specified property representing a frequency (e.g., in hours) at which to record current license usage. No value indicates license usage should be updated on launch and termination of a resource instances.

ExpirationDate: A user-specified property that indicates the expiration date of the license agreement.

Additional {LicensingMetric, NumberOfLicense} property pairs if the underlying license agreement provides multiple license consumption methods, optionally including a property that includes a formula for calculating the total license usage (when multiple consumption methods are used) and/or a property that prioritizes methods of license consumption.

Other embodiments may include more, fewer, or a variable number of license properties in a license rules configuration, and the properties may represent a variety of factors such as those similar to those described above and others.

At circle B, having received the license properties, the LMS 105 creates a license rules configuration that includes the properties in the license data store 110, which may be a database or other storage location that maintains the license rules configurations. In some embodiments, the license data store 110 provides version-controlled storage of the license rules configuration to manage updates, track changes, and provide the ability to export and import licensing definitions. Also as indicated at circle B, the LMS 105 assigns a license rules configuration identifier (also referred to as a license identifier) that uniquely identifies the license rules configuration from other license rules configurations (either globally within the provider network 100 or locally within the user account). The LMS 105 sends the assigned license identifier to the electronic device 190, as indicated at circle A.

At circle C, having received the license identifier of the new license rules configuration, an administrator 191 can cause an electronic device 190 to send a message to the resource service 115 to add the license identifier to or to otherwise associate the license identifier with one or more resource configurations stored in the resource configurations data store 120 (e.g., instance types, machine images, launch templates, and formation templates). For example, a license for a particular operating system may be associated with a machine image utilizing that operating system. As above, the message may be sent via a frontend interface (e.g., via a CLI, web-browser interface, SDK, etc.). Multiple license identifiers may be added to each resource configuration for configurations that leverage multiple licensed resources (e.g., multiple software programs). At circle D, the resource service 115 adds the license identifier to the resource configuration in the resource configurations data store 120 (e.g., as a tag or property of the resource configuration).

At circle E, after a license rules configuration is created and added to a resource configuration, a license user 192 can cause an electronic device 190 to send a message to the resource service 115 to request the launch or instantiation of a resource. Exemplary messages might identify an instance type and a machine image, a launch template, or a formation template, and are again sent via a frontend interface as described above. At circle F, the resource service 115 obtains the license identifier(s) added to the resource configuration in the resource configurations data store 120 based on the resource configuration identified in the request. In addition, the resource service 115 obtains other properties associated with the resource configuration (e.g., properties associated with the software or hardware configuration of the requested resource configuration).

At circle G, the resource service 115 sends a message to the LMS 105 that requests permission to launch a resource instance. The message may be sent to an API that is part of the LMS 105 and allows for backend services to interact with the LMS 105. The message may include the obtained license identifier(s) and other properties associated with the resource configuration (e.g., number of vCPUs associated with the resource configuration requested at circle E). The message may further include a preliminary resource identifier to identify the resource instance 125 if permission is granted.

In some embodiments, the request for permission is sent via a synchronous interface to cause the resource service 115 to delay launching the resource instance 125 until it receives permission from the LMS 105, thereby avoiding license overages.

At circle H, the LMS 105 obtains one or more properties associated with the license rules configuration identified by the license identifier and performs a rules check to determine whether instantiation of the resource instance is permissible under the license rules configuration. To do so, the LMS 105 evaluates the resource configuration properties against a set of rules specified by the license properties.

In some embodiments, the LMS 105 evaluates whether the resource configuration properties include an identification of the metric identified by the LicensingMetric property. For example, if LicensingMetric is vCPUs, the resource configuration properties includes a value for or comparable to vCPUs. If the resource configuration cannot be evaluated against the LicensingMetric, the rule is violated. In some embodiments, the LMS 105 evaluates whether the amount of the LicensingMetric identified by the resource configuration properties as adjusted by the MetricToLicensesRatio property, if other than 1, does not exceed the NumberOfLicenses property after accounting for current license usage. For example, this rule would not be violated if the resource configuration properties identify two vCPUs, the MetricToLicensesRatio indicates that two vCPUs consume one license, the NumberOfLicenses is one-hundred and the LMS 105 determines there are five licenses used (i.e., indicating 95 licenses are available). In some embodiments, the LMS 105 evaluates whether that the resource configuration properties indicate the underlying hardware supporting the resource instance is consistent with the AllowedTenancy property. For example, a shared hardware configuration (supporting multiple VMs of different users or customers) would fail a rule check if the AllowedTenancy property required Dedicated tenancy. In some embodiments, the LMS 105 evaluates whether the resource configuration properties indicate the resource instance can be traced to particular physical hardware. For example, a virtual hardware configuration rather than a physical hardware configuration would fail a rule check if the DaysOfServerAffinity property was greater than zero (indicating the license had to be tied to a physical server). In some embodiments, the LMS 105 verifies that the ExpirationDate property does not indicate the license has expired. The set of rules evaluated as part of a compliance check can vary from one embodiment to another.

In some embodiments if one or more of the rules are violated, the LMS 105 proceeds based on the value of the UsageLimitType property in the license rules configuration. If the UsageLimitType property indicates there is a hard limit on license consumption, the LMS 105 responds to the resource service 115 by denying the request for permission to launch the resource instance. In some embodiments, the LMS 105 can cause the resource service 115 to propagate an error message to the license user 192 that includes the reason for the failure to launch the resource instance (e.g., launching would exceed the NumberOfLicenses property). In some embodiments, the error message can be tailored by the license administrator 191 during configuration of the license rules configuration. If the UsageLimitType property indicates there is a soft limit on license consumption, the LMS 105 responds to the resource service 115 by granting the request for permission to launch the resource instance. If none of the rules are violated, the LMS 105 can grant the request to launch the resource instance from the resource service 115. In some embodiments, the grant or denial of permission to launch a resource instance may depend on the specific rule or rules the LMS 105 determined were violated.

When the LMS 105 grants permission to the resource service 115 to launch the resource instance, the LMS 105 may update the license data store 110 with a record of the preliminary resource identifier sent with the request for permission to aid in tracking current license usage. In some embodiments, the resource service 115 assigns a resource identifier after receiving permission and sends the assigned resource identifier to the LMS 105. Upon receiving permission, the resource service 115 launches the resource instance 125, as indicated at circle I.

Returning to circle H, the LMS 105 can determine existing license consumption in a variety of ways. For example, the LMS 105 can update a data structure associated with the license rules configuration in the license data store 110 each time it grants permission to launch a resource instance with the number of licenses consumed by the permitted resource instance. The number of consumed licenses may be stored without attributing consumption to any particular resource instance (e.g., 50 consumed licenses) or attached to each permitted resource instance (e.g., resource identifier A is attributed 5 licenses, resource identifier B is attributed 1 license, etc.). In some embodiments, if the number of licenses consumed by each resource instance is constant, the LMS 105 can track the identity of each launched resource instance and determine the number of consumed licenses based on the number of tracked instances.

At circle K, the LMS 105 can cause a notifications service 135 to issue notifications to users. The content of and conditions for sending a notification may be configured by the license administrator 191 when creating the license rules configuration. Exemplary notifications include: sending a warning when existing license consumption approaches the NumberOfLicenses value (e.g., when an absolute or relative threshold number of consumed licenses are reached or soon to be reached); sending an alert if a request to launch an instance is denied, the alert identifying the requested resource configuration, the license identifier that failed a compliance check, and/or an identity of the license user 192 that initiated the request; sending an alert or warning when a license overage occurs (e.g., when UsageLimitType permits launching additional resource instances despite exceeding NumberOfLicenses), etc.

At circle J, the LMS 105 records license usage history in a records data store 130 in some embodiments, depending for example on the value of the PreserveHistory property of the license rules configuration. When PreserveHistory is true, the LMS 105 records license usage history in the records data store 130 as specified by the PreserveHistoryLocation property. Depending on the value of the PreserveHistoryFrequency property, the history may be recorded in a change-based log that is updated each time a resource instance is launched or terminated (e.g., when PreserveHistoryFrequency is unspecified) or a snapshot-based log that includes point-in-time license usage of any existing resource instances (e.g., when PreserveHistoryFrequency is set to 2, 4, 8, etc. hour intervals).

At circle L, users can request license usage reports or pull data relating to license usage (e.g., current usage as determined by the LMS 105 or historical usage as recorded in the records data store 130). These reports or data allow users to view license consumption in detail to identify which resources are consuming licenses, easily comply with audit requirements, or to allow license auditors 193 direct access to license usage history to avoid interrupting operations to comply with audit requests.

As shown by circle M, a defragmentation service 140 (e.g., a software module implemented as a microservice) of the LMS 105 may detect fragmentation of dedicated host computing devices of a host resource group associated with an account, and may cause compute instances executing in the host resource group to be migrated (e.g., via interacting with a migration service 145 or other control plane entity of the resource service(s) 115) to new locations within the host resource group to eliminate or reduce the fragmentation. Further aspects of the defragmentation service 140 are provided later herein with regard to subsequent figures.

In some embodiments, if the properties identifying the software programs associated with a software configuration are available, adding a license identifier to a resource configuration may be omitted (i.e., circles C and D in FIG. 1). In such cases, the resource service 115 can request permission to launch an instance via a message to the LMS 105 that includes properties associated with the software configuration (without looking up or sending a license identifier at circles F and G). The LMS 105 can match the software programs associated with the resource configuration to license rules configurations within the license data store 110 as part of performing compliance checks (e.g., based on a Name property or some other property that identifies the software program).

In some embodiments, a user such as license administrator 191 can register certain resource configurations as a property within a license rules configuration. When the resource service 115 receives a request to launch a resource instance (circle E), the resource service 115 can send the identity of the resource configuration (e.g., instance type, machine image, launch template, or formation template) to the LMS 105 along with the request for permission to launch the resource instance. The LMS 105 can match the received resource configuration with resource configurations specified in properties within the license rules configuration as part of performing compliance checks.

In some embodiments, the LMS 105 may have access to the resource configurations data store 120 or a replica of the resource configurations data store 120. When the resource service 115 receives a request to launch a resource instance (circle E), the resource service 115 can send the identity of the resource configuration (e.g., instance type, machine image, launch template, or formation template) to the LMS 105 along with the request for permission to launch the resource instance. The LMS 105 can look up properties associated with the received resource configuration within the resource configurations data store 120 for use in compliance checks without receiving the properties from the resource service 115.

In some embodiments, a default set of hardware and/or software configuration properties associated with a resource configuration may not include a property that corresponds to the LicensingMetric property in the license rules configuration. In such cases, the license administrator 191 may tag the resource configuration with a key-value pair to associate a value for the LicensingMetric with the resource configuration. For example, the key may have a reserved name that, if defined, can be obtained by the LMS 105 before granting or denying permission to launch a resource instance to the resource service 115.

In some embodiments, a software vendor rather than a license administrator 191 creates a license rules configuration for a software product. In acquiring the software product, the software vendor may export the license rules configuration so the license administrator 191 can import it into the user's license data store 110, or the software vendor may share the license rules configuration with the user via the license data store 110.

FIG. 2 is a diagram illustrating one exemplary data structure for storing license rules configurations and tracking license usage according to some embodiments. As illustrated in FIG. 2, the exemplary data structure includes entries 290, 295, and 297. Such a data structure (e.g., a relational database table or tables) may be stored in the license data store 110. Like some of the license rules configuration properties described above, exemplary fields in the entries include a license identifier field 205, a license name field 210, a license description field 215, a number of licenses field 220, a licensing metric field 225, a metric to license ratio field 230, a days of affinity field 235, a limit type field 240, an allowed tenancy field 245, a preserve history field 250, and a resource identifiers or usage field 255. In this embodiment, each entry represents a license rules configuration with an exemplary set of properties. For example, entry 290 relates to Windows Server and has a limit of two-hundred licenses that are consumed on a per physical core basis. As another example, entry 296 relates to a video rendering library license that is limited based on a function of metrics, namely consumption is permitted for hosts with four or fewer graphics processing units (GPUs) per CPU.

In some embodiments, the LMS 105 can track license usage using an array of objects in the resource identifiers or usage field 255. The array of objects includes names that correspond to resource identifiers and values that correspond to the number of licenses consumed by the respective resource identifier, as illustrated in the resource identifiers or usage field 255 for entry 290. To determine current usage, the LMS 105 can add up the total number of consumed licenses in the array. For example, based on the listed entries, the LMS 105 can determine that eight licenses have been consumed (i.e., five by the resource identified by "I-129381", two by the resource identified by "H-199121", and one by the resource identified by "MI-168246"). In other embodiments, the LMS 105 can track license usage by keeping a count of the total number of consumed licenses, as indicated by usage field 255 for entry 295. When a license is consumed (or released) by a resource, the LMS 105 increments (or decrements) the count by the number of licenses associated with that resource.

Turning back to FIG. 1, in some embodiments the LMS 105 includes a defragmentation service 140, which may operate as a micro-service or other subcomponent of the LMS 105 that is operative to identify resource instances 125 that should be moved—to other host computing devices, or to other locations on a same host computing device—on behalf of users, and cause these resource instances 125 to be migrated to these new locations accordingly. For example, in some embodiments, the defragmentation service 140 may identify one or more resource instances 125 to be moved and signal a migration service 145 of the provider network 100 to perform these migrations.

In some embodiments, the LMS 105 (e.g., via the migration service 145) may thus move or "migrate" resource instances 125 within or between dedicated hosts of a host resource group associated with a customer. As described herein, in some embodiments the provider network may offer its users dedicated hosts, which are server computing devices that are dedicated for use only by a single customer for a period of time. Using dedicated hosts, users can quickly launch resource instances on physical servers dedicated for their own use, which allows these users to utilize software licenses that may need to be tied to specific hosts.

Further, in some embodiments, users may create a "pool" of dedicated hosts referred to herein as a "host resource group." A host resource group is a collection of dedicated hosts that can be managed together as a single entity using preferences specified by the customer, and the zero, one, or multiple hosts belonging to the host resource group can change over time. These management preferences include settings such as the automatic allocation and release of hosts, recovery behavior of hosts in case of a host failure, which license configurations to use, etc. A customer may utilize host resource groups, as one example, by providing management preferences for the host resource group, attaching a license configuration to machine image, and then launching compute instances into the host resource group. As the user launches these instances, LMS 105 takes care of host allocation and placing instances into them based on the user-provided management preferences.

Accordingly, in some embodiments the defragmentation service 140 of the LMS 105 can determine when to move instances deployed within a host resource group to other hosts in the group or to another location (e.g., a "slot") of a same host in the host resource group. This movement, as described herein, can beneficially reduce license usage for the user and/or reduce the number of hosts existing in a user's host resource group, which can reduce management and financial costs for the user and frees up these resources (e.g., hosts) for use by other customers of the provider network, increasing overall capacity/efficiency of the provider network as a whole.

The described movement of the resource instances within hosts or between hosts in may take one of several forms of migration, where one or multiple of these forms may be available for use in a deployment. Generally, "migration" refers to moving virtual machine instances (and/or other associated resources) between hosts in a cloud computing network, to different locations within hosts in the cloud network, or even between hosts outside of the cloud computing network and hosts within the cloud network.

There are different types of migration including live migration and reboot migration. During a reboot migration, the customer experiences an outage and an effective power cycle of their virtual machine instance. For example, a control plane service can coordinate a reboot migration workflow that involves tearing down the current execution domain on the original host and subsequently creating a new execution domain for the virtual machine instance on the new host. The instance is rebooted by being shut down on the original host and booted up again on the new host (or new host location).

In some embodiments, the LMS 105 may utilize live migration to move resource instances, which refers to the process of moving a running virtual machine or application between different physical machines (or different slots/locations within a same physical computing device) without significantly disrupting the availability of the virtual machine (e.g., the down time of the virtual machine is not noticeable by the end user, or only noticeable as an extremely brief disruption of service). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host (or location) with the inactive domain. The virtual machine may be briefly paused to prevent state changes while transferring memory contents (e.g., a delta set of changes to memory made between a full memory copy and the pausing of the virtual machine) to the destination host location. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the user—which should be kept as short as possible. In some migration settings this can be especially challenging, as resources may be moved between hosts in geographically separate locations which may be connected over one or more intermediate networks. For live migration, embodiments can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component of the migration service 145 in a same region of the provider network, or by a migration management component running locally in the source location. If the instance has access to virtualized storage, both the source domain and target domain can be simultaneously attached to the storage to enable uninterrupted access to its data during the migration and in the case that rollback to the source domain is required.

FIG. 3 is a diagram illustrating an exemplary user interface for host resource group creation and auto-migration enablement for automated defragmentation of licensed resources in a provider network according to some embodiments. In some embodiments, this user interface (UI) 300 can be provided by an electronic device 190 to an administrator 191 user (e.g., based on data provided by the LMS 105 or provider network 100). The user may use the UI to provide or select host resource group information for creating or editing a host resource group. The electronic device 190 may then send a request message to an endpoint associated with the LMS 105 (or another control plane entity of the provider network 100) to create or edit such a host resource group (e.g., with this data provided by the user via the UI 300), causing the LMS 105 to create or define a host resource group in accordance to the request.

For example, a user may use one or more UI elements 305 to provide host resource group information such as a host resource group name (e.g., "MYGROUP1" provided by a text input box UI element), a description of the host resource group, etc.

The user may also use one or more UI elements 310 to provide settings used by the LMS 105 to automatically manage dedicated hosts of a host resource group according to the user's preferences. For example, the user may use a UI element (e.g., a checkbox) to indicate whether the LMS 105 should allocate hosts automatically—e.g., whether LMS 105 can allocate a new host on the user's behalf when there is not enough capacity available on an existing host (of the group) to launch a requested instance.

As another example, the user may use a UI element (e.g., a checkbox) to indicate whether the LMS 105 should release hosts automatically—e.g., to specify whether the LMS 105 should keep a host device allocated (e.g., reserved and operational for the user's account) or to release it when it no longer has an active instance running on it. This setting may thus enable a user to keep the host when licensing terms require the same hardware for a given license to be reused up to a certain period.

Additionally, or alternatively, the user may use a UI element (e.g., a checkbox) to indicate whether the LMS 105 should recover dedicated host devices automatically—e.g., to specify whether the instances running on a host can be moved to a new host in the (likely very) rare case of an unexpected host failure.

Notably, in some embodiments, the UI 300 may provide one or more UI elements 315 allowing the user to specify or select whether hosts may be defragmented automatically (here, via a checkbox) and/or whether to enable an aggressive host release technique on the part of the LMS 105.

For example, when the user selects the UI input element (e.g., checkbox) to defragment hosts automatically, the LMS 105 may perform techniques disclosed herein for determining that defragmentation is to be performed, selecting destination locations (e.g., hosts, and/or specific slots) for instances to be moved, and causing these instances to be moved to new locations without significant service disruption.

When the user has indicated that the LMS 105 is to perform automatic host defragmentation, the UI element(s) 315 may allow the user to control aspects of the defragmentation. As one example, the UI may allow the user to specify how the LMS 105 is to determine when to release hosts during defragmentation, e.g., via a UI element such as the illustrated "enable aggressive host release." When the LMS 105 is instructed to apply an aggressive approach to defragmentation host release, the LMS 105 may determine to try to release hosts—including those with licenses remaining tied to the host for potentially a significant amount of additional time—when possible. As indicated in the example UI element(s) 315, this setting may be desired by a user when the user has a large number of licenses, license costs are very minimal or free, etc., and the user would prefer to simply terminate hosts instead of keeping them around (e.g., as the host would be non-utilized, may incur cost for the user, and may be better used by other users of the provider network).

The user may also provide, via the UI element(s) 310, information specifying allowed instance types (or, "instance families") that may be run by the set of dedicated hosts. In some embodiments, users can specify a list of instances to limit the allowed instance families that can be launched into the host resource group. For example, users may choose a set of one or more instance families in a particular manner, e.g., a particular set of instance families in which different sizes of the instances can be run on a same host to allow better utilization of available capacity of the hosts.

The UI 300 may also include one or more UI elements 320 allowing the user to specify software-based license configurations (earlier defined or configured for the user's account) to be associated with the host resource group. In the illustrated example, a "drop down box" UI input element allows the user to associate one or more core/socket-based license configurations to the host resource group. Once license configurations are associated with the host group, the host resource group may be used exclusively for those license configurations, which can allow the LMS 105 to better utilize licenses (e.g., comparatively expensive licenses) by not using other licenses on the same host resource group.

In some embodiments, a user may also choose not to associate a license configuration to a host resource group. In that case, any core/socket-based license configuration may be allowed on the host resource group, and LMS 105 will better utilize dedicated host capacity irrespective of what licenses are used. Users may beneficially use this setting, e.g., when they have an unlimited number of licenses and would like to optimize for host utilization.

As described herein, dedicated hosts provided by a provider network 100 may expose particulars regarding underlying server devices (that run instances) to users, potentially allowing them visibility into the physical cores and sockets used therein, which may allow users to utilize software (e.g., operating systems, databases, etc.) that have physical core/socket-based licenses. However, the use of dedicated hosts departs from cloud-centric concepts (that typically attempt to abstract away low-level details) and the resulting ongoing management demands—such as those imposed by the use of software licenses—that are placed on users create a substantial overhead.

Accordingly, the LMS 105 described herein can perform management of hosts on behalf of its users, potentially performing operations such as allocating hosts when needed, deallocating hosts when needed, placing instances on hosts, etc. Thus, in some embodiments, the LMS 105 can perform intelligent placement operations (for new instances) by packing these instances on hosts as densely as possible, so that any hosts are well-utilized. This is particularly important to the provider network (e.g., to reduce "wasted" capacity that users have reserved but are not utilizing) as well as its users, who typically incur an expense to utilize these hosts, e.g., via costs on a per-host per-time basis, as opposed to on a per-instance basis.

However, over time, users may terminate instances, leading to capacity utilization drops. Over time, when the rate of instance launches is not keeping up with the rate of instance termination across a fleet of dedicated hosts, many of these hosts will become under-utilized. This is due to fragmentation, in which there is available (or free, unused) capacity spread across multiple hosts. Fragmentation may also be an intra-host issue, such as when multiple portions of a same host are not optimally used. Thus, a host may have spare capacity, but it may not be useable, such as when it is not contiguous capacity where instances could be placed—e.g., it may be split across Non-uniform Memory Access (NUMA) boundaries. As a result, the available "slots" of a host device may be individually too small to place useful instances, as attempting to place an instance across non-contiguous boundaries (e.g., across two sockets with separate memory banks) may often lead to performance that is unacceptably poor.

Accordingly, in some embodiments, the defragmentation service 140 of the LMS 105 may address intra-dedicated host fragmentation and/or inter-dedicated host fragmentation via use of migration techniques, potentially without user involvement.

Figure 4:
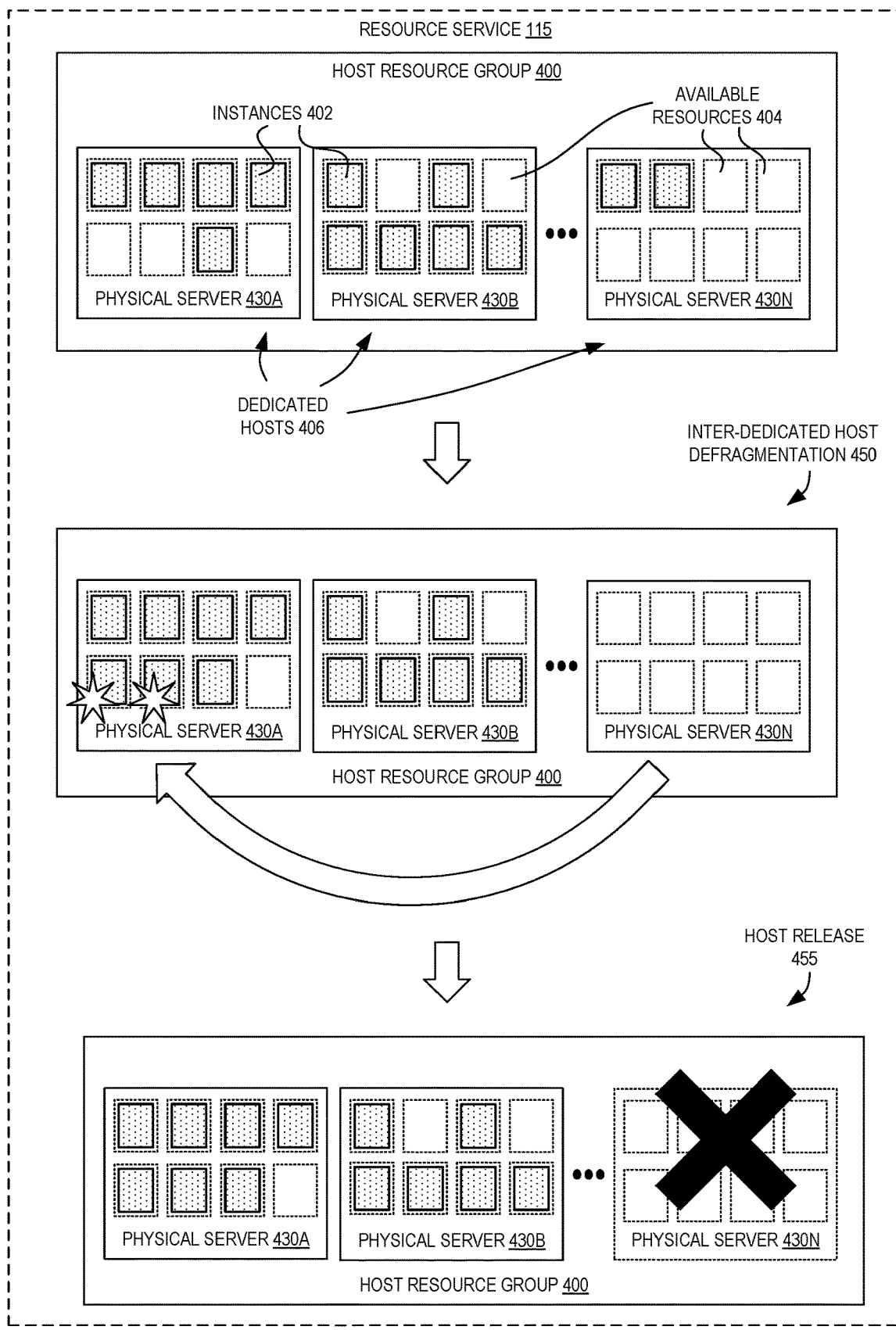
FIG. 4 is a diagram illustrating exemplary fragmentation of resource instances deployed to dedicated hosts in a host resource group and an exemplary inter-dedicated host defragmentation process with host release according to some embodiments.

For example, FIG. 4 is a diagram illustrating exemplary fragmentation of resource instances deployed to dedicated hosts in a host resource group and an exemplary inter-dedicated host defragmentation process with host release according to some embodiments. In this example, a set of dedicated hosts 406 collectively belonging to a host resource group 400 is shown. These dedicated hosts 406 may be implemented by a resource service 115, such as a hardware virtualization service, and the LMS 105 may manage the host resource group 400 as described herein.

In this example, the dedicated hosts 406 include physical servers 430A-430N, where each server is shown as executing one or more instances 402. In this example, the instances 402 are shown as being of a same size, and thus it could be the case that the host group is executing only a same type of instance, though in other embodiments this need not be the case and the host group may execute different types or sizes of instances. As shown, each of the physical servers 430 includes some amount of available resources 404 that could potentially be further utilized, e.g., by executing other instances. In this example, the first physical server 430A is running five instances and has three "slots" of available resources (e.g., for potentially running three additional instances), the second physical server 430B is running six instances and has two slots available, etc.

The defragmentation service 140, at one or more points in time, analyzes the host resource group 400 to determine whether to perform a defragmentation, and if so, thereafter determine which hosts and instances to defragment, where to move instances, and/or cause the migration of the instances to their new, target locations.

For example, in some embodiments the defragmentation service 140 may be triggered to determine whether defragmentation is to be performed according to a schedule or periodic basis—e.g., every hour, every six hours, every day, or the like—to determine if defragmentation should be performed, and if so, performs the defragmentation. Additionally, or alternatively, the defragmentation service 140 may perform such a defragmentation analysis in response to another system or event triggering it to do so—e.g., in response to an explicit user request (e.g., a "perform defragmentation" request message, or similar request message sent on behalf of the user that specifies the user's account and/or host resource group), in response to detecting a high threshold or low threshold utilization of one or multiple resources in the host resource group (e.g., via receiving an event or alarm message from a monitoring service of the provider network or an agent running on (or part of) the physical servers 430), or even detecting an event associated with one(s) of the instances 402 such as a restart of an instance, a termination of an instance, or the like.

In some embodiments, the defragmentation service 140 determines whether a defragmentation is to be performed based on determining whether an inter-host fragmentation condition exists. An inter-host fragmentation condition may be defined by the operator of the defragmentation service 140 or defined by the associated user for a host resource group, and may specify one or more logical conditions that can be evaluated to determine whether inter-host defragmentation exists. For example, a condition may be utilized that specifies if a first host is less than a threshold amount (e.g., 50% utilized, 30% utilized, etc.) and if the available resources on the other hosts in the host resource group meet or exceed the instance usage on the first host (i.e., the instances could be re-homed on other hosts), then the condition is met and defragmentation is to occur. However, many other conditions could also beneficially be used based on the desires of the provider or user, e.g., a condition could be implemented that simply determines whether, for a host, all of the instances on the host could be moved to other hosts in the group (optionally subject to any other existing placement constraints, such as instance co-location requirements indicating where groups of instances may or may not be placed, geographic constraints indicating where instances may or may not be run, etc.), which may or may not contemplate the potential defragmentation of other hosts as well (e.g., to address intra-host fragmentation as described subsequent herein).

In FIG. 4, we assume that the defragmentation service 140 has been triggered to determine whether a defragmentation is to be performed in some manner (e.g., based on a schedule such as an hourly trigger), and the defragmentation service 140 obtains resource utilization data associated with the host resource group 400. The resource utilization data may describe current usage information about each of the hosts, such as information describing how many instances are executing on a host, what type of instances are executed on the host, at what locations (e.g., slots) on the host the instances are executing, etc.

Based on this resource utilization data, the defragmentation service 140 in this example determines whether any hosts are below a threshold amount of utilization (e.g., less than 50% of available resources are in use), which in this example we assume is satisfied by physical server 430N, where two of eight available slots are in use by instances.

The defragmentation service 140 may also determine, as part of the condition, whether sufficient resource capacity exists elsewhere within the host resource group 400 to re-home these instances—e.g., whether there are at least two total slots worth of resources exist that are of a sufficient size to accommodate those instances. In this case, the defragmentation service 140 may determine that there are three available slots on a first physical server 430A in the group, two available slots on a second physical server 430B in the group, etc., and thus there are more than enough slots available. The defragmentation service 140 may in some embodiments perform this analysis using resource amounts and/or locations, such as by analyzing amounts of available virtual cores, memory, storage, bandwidth, or the like. This analysis may be performed using the resource utilization data, or by querying other systems (e.g., a monitoring service, a control plane entity of a hardware virtualization service, agents executed by the dedicated hosts 406 themselves, etc.)

Upon determining that sufficient available resources exist within the host group to re-home these instances from the identified physical server 430N, in some embodiments the defragmentation service 140 may then perform an analysis to determine where to place the instances, or may call another system (e.g., a placement service of a control plane of a hardware virtualization service) to determine where to place the instance or instances.

This analysis may be performed on an instance-by-instance basis, or performed using groups (e.g., some or all) of the instances deployed on the host physical server 430N. For example, it may be the case that the user has specified that certain groups of two or more instances must be placed on a same host, and thus the analysis seeks to identify other hosts in the group that could host all of these instances. As another example, it may be the case that the user has specified that certain groups of two or more instances must not be placed on a same host, and thus the analysis seeks to identify multiple hosts in the group that each could at least one of these instances.

In some embodiments, the placement algorithm may identify a host within the group having an available slot (or a collection of available resources) that can be used to launch at least one of the instances. This placement algorithm may consider groups of hosts for this purpose, and perform decision-making based, for example, on current utilization and/or future anticipated utilization of these hosts. The placement algorithm, in various embodiments, may seek to place instances on a "least" busy host, on a "most" busy host, etc. For example, as shown in FIG. 4, although at least two physical servers 430A/430B have sufficient available resources to home the two instances, the placement algorithm selects the first host (physical server 430A) to host the two instances, which may have been decided based on one or more factors such as instance co-location requirements, a goal to place instances on a "least" or "most" busy server (currently and/or in the future according to predicted or known future usage), geographic preferences, and/or other goals.

With an identified new placement for each instance, the defragmentation service 140 may cause these instances to be moved to their new locations via a migration-based technique to perform the inter-dedicated host defragmentation 450. Migration refers to moving virtual machine instances (and/or other resources) between hosts in a cloud computing network, or within a same host but to a different location or slot of the host.

In some embodiments, it may be possible to simply shut down an instance and re-launch it in a new location, which may be referred to as a "reboot migration." During a reboot migration, the user experiences a brief outage via an effective power cycle of their virtual machine instance(s). For example, a control plane service can coordinate a reboot migration workflow that involves tearing down the current domain on the original host and subsequently creating a new domain for the virtual machine instance on the new host. The instance is rebooted by being shut down on the original host and booted up again on the new host (or location).

This technique works extremely well in some use cases, though this approach may create a disruption of service if the instances need to remain in current use during the migration. Thus, in some cases when it may be important for the instances to remain in service without any significant service disruption, the defragmentation service 140 may move these instances in a different manner. Accordingly, in some embodiments the defragmentation service 140 may directly or indirectly (e.g., via calling a separate service of a hardware virtualization service) perform a "live" migration of the instances to their new locations that avoids significant or observable disruptions of service to these instances.

Live migration refers to the process of moving a running virtual machine or application between different physical machines (or different locations of a same host) without significantly disrupting the availability of the virtual machine instance (e.g., the down time of the virtual machine is not noticeable by the end user). When the control plane executes a live migration workflow it can create a new "inactive" domain associated with the instance, while the original domain for the instance continues to run as the "active" domain. Memory (including in-memory state of running applications), storage, and network connectivity of the virtual machine are transferred from the original host with the active domain to the destination host with the inactive domain. In some embodiments, this movement occurs at multiple points in time; e.g., all memory is copied at a first point in time, and then during the migration itself, any changed memory elements (or "deltas") resulting from intermediate activity may be copied over, which requires far less data transfer and is relatively quick. The control plane can thus transition the inactive domain to become the active domain and demote the original active domain to become the inactive domain (sometimes referred to as a "flip"), after which the inactive domain can be discarded.

In some embodiments, when the instances are no longer operational on the host physical server 430N, the host may be "released" 455 from being a part of the host resource group 400, which may be performed by the defragmentation service 140 causing the physical server to no longer be part of the group (e.g., by updating a data store/database) or, e.g., by the hardware virtualization service detecting that no instances are currently running on the physical server 430N. Thus, the host may beneficially be used for other uses, either as a dedicated host for another user, or as a differently purposed host that may host instances or perform other tasks. Additionally, as the host is released from the host resource group 400, the user may no longer incur costs/fees associated with having that active dedicated host. Additionally, in some cases, users may be utilizing software licenses that are applied at the physical host level, and upon removing a host it may be possible for the user to immediately (or at some point thereafter) stop incurring this license cost.

In some embodiments, prior to migrating an instance and/or releasing a host from the host resource group, the LMS 105 may notify an associated customer or user account, and optionally seek confirmation that the action may be performed—e.g., that an instance is OK to be migrated, that a host is OK to be released, etc. Thus, in some cases customers may maintain control and supervision of the host resource group, but beneficially, in some embodiments the LMS 105 may make these decisions without customer/user input, relieving the managerial burden placed on the customer.

In some embodiments, after a migrating an instance and/or releasing a host from the host resource group, the LMS 105 may notify an associated customer or user account of the change, and optionally allow the customer or user to provide a command to "undo" the change, e.g., via a user interface input element such as an "undo" button which, when selected, causes the user's device to send an undo request message to the LMS 105, causing the LMS 105 to move the instance (or instances) back to its original location and/or to attempt to re-obtain the host and add it back into the host resource group. To this end, in some embodiments the LMS 105 may cause a host that is released from a host resource group to be unavailable to other customers for a brief amount of time (though optionally it could be used for provider network operations that are easily disruptable), allowing the affected users some time to re-acquire the host if so desired.

Figure 5:
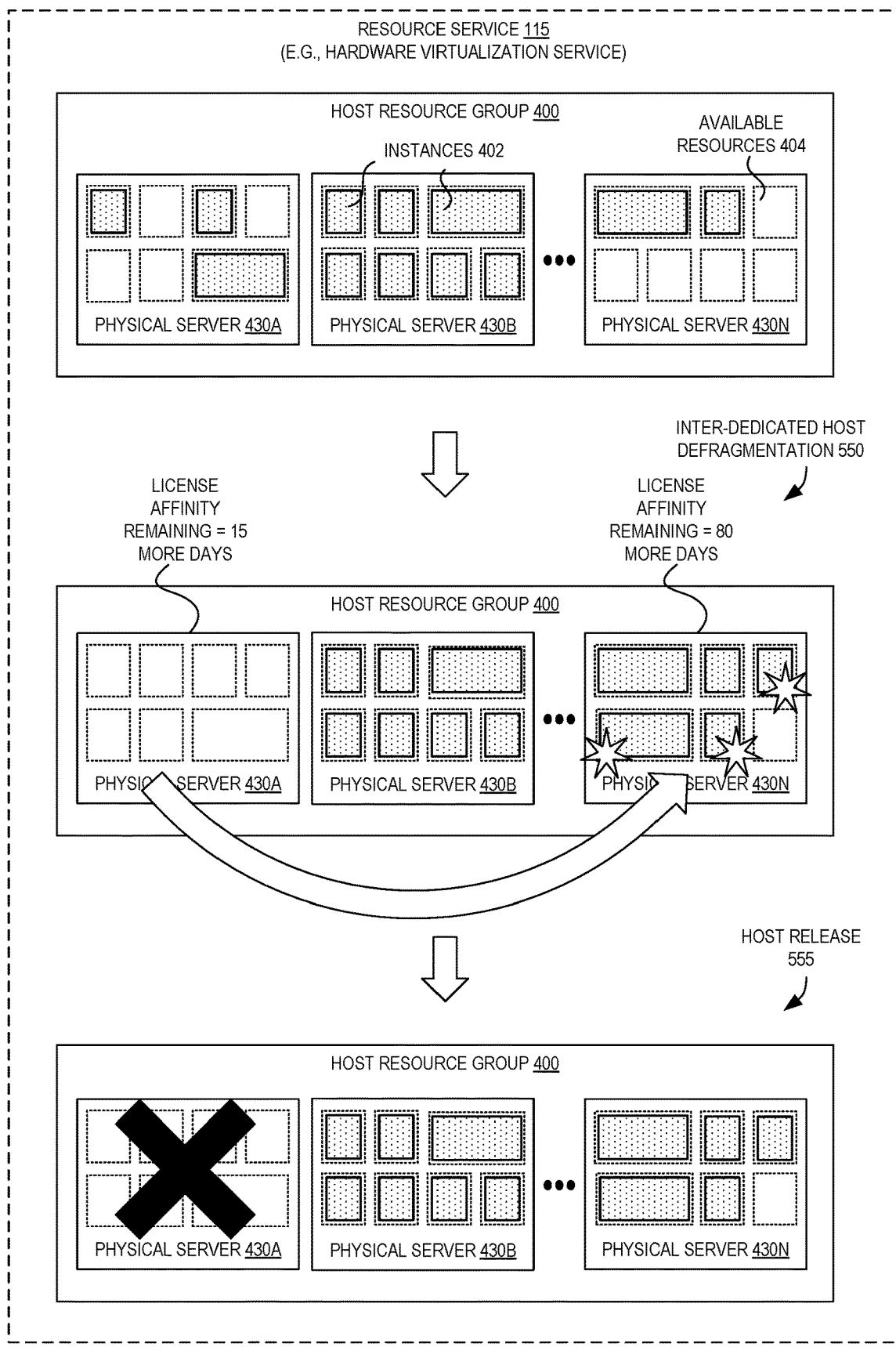
FIG. 5 is a diagram illustrating exemplary fragmentation of resource instances deployed to dedicated hosts in a host resource group and an exemplary inter-dedicated host defragmentation process including affinity analysis with host release according to some embodiments.

In some cases, the defragmentation processes may also involve other considerations, e.g., heterogeneous instance sizes, license affinity timeframes, etc. As one example, FIG. 5 is a diagram illustrating exemplary fragmentation of resource instances deployed to dedicated hosts in a host resource group and an exemplary inter-dedicated host defragmentation 550 process including affinity analysis with host release 555 according to some embodiments. In this example, both the physical servers 430A and 430N may be determined to be candidates for instance-removal using techniques disclosed above, e.g., one or more conditions being satisfied (e.g., a utilization condition where less than or equal to 50% of the resources of the host are being used, or have been used for a recent period of time, etc., perhaps combined with a placement availability condition that all instances on the host could be placed on available resources of one or more other existing physical servers in the host resource group 400).

In this example, physical server 430A is running two "small" instances and one "medium" instance (that requires two times the resources of a small instance, and thus is represented by a medium slot that is the same as two small slots) leaving four "small" slots worth of resources available for a utilization of 50%, whereas physical server 430N is running one "small" instance and one "medium" instance, leaving five "small" slots worth of resources available for a utilization of 37.5%. With utilizations of 50% and 37.5%, both physical servers satisfy the fragmentation condition, and additionally, the placement availability condition is satisfied for each server as the two small instances and one medium instance from physical server 430A could be placed on physical server 430N, and likewise, the one small instance and one medium instance of physical server 430N could be placed on physical server 430A (though it may also be the case that other non-illustrated physical servers may exist in the host resource group 400 with resources available). In this example, though, it might be determined that only one of these hosts physical servers 430A/430N could be migrated, as the instances from one would need to be migrated to the other.

The determination of which host's instances to move can be made in various embodiments based on one or more of a variety of factors. For example, the defragmentation service 140 may make a decision based on a number of instances to be moved (e.g., preferring to move fewer instances, or preferring to move more instances), an amount of resources to be moved and/or the types of the involved instances (e.g., preferring to move larger instances or smaller instances), an amount, type, remaining life, and/or cost of licenses utilized by the hosts (e.g., preferring to move instances off of hosts having fewer licenses, more instances, smaller license durations remaining, larger costs, etc.), sizes or costs of the hosts (e.g., preferring to move instances away from larger or costlier hosts), geographic locations of the hosts, observed or predicted failure rates associated with the hosts or locations of the hosts, geographic locations of users of the instances (e.g., preferring to move instances off of hosts that are further away in terms of geography or network distance from their users), etc.

In the illustrated example of FIG. 5, at least one of the factors under consideration is the remaining amount of license affinity for at least one license associated with the host physical servers 430A/430N. In this example scenario, it may be the case that the physical servers have a license that is host-bound (e.g., an operating system license) and cannot be used on another physical server device (or cannot be used on another physical device until an amount of server affinity time has expired). In this example, physical server 430A has a license associated with it that cannot be re-used on another server device for fifteen more days, whereas physical server 430N has a license associated with it that cannot be re-used on another server device for eighty more days.

Accordingly, in some embodiments if it is determined that instances from only one—and not both—of the physical servers could be moved, the defragmentation service 140 make a determination entirely on (or partially based on, as one factor) which license is to "expire" first (e.g., have its host affinity timeperiod expire first, or have it completely expire). Here, as physical server 430A will have its license affinity end the soonest, the instances of that host physical server 430A may be selected to be moved. As a result, that license could be re-used comparatively sooner than the other license. Alternatively, when licenses simply expire, this process will preserve hosts that have a longer life remaining, effectively discarding the one(s) that will expire the soonest.

In some embodiments, users of the LMS 105 may provide configuration inputs, such as those described with regard to FIG. 3 (e.g., the enabling of aggressive host release or similar), to specify or affect how the defragmentation service 140 is to make the determinations of which hosts should or should not be removed.

For example, a user may specify via the UI elements 315 that they seek an aggressive mode of host release, which may be preferable when the user does not have license scarcity or is relatively more sensitive to costs of keeping the hosts around (i.e., the user seeks to optimize for host cost over optimizing for license cost). In this case, the user may desire that both host physical servers 430A/430N should be released—assuming that all instances could be placed elsewhere in the host resource group 400, such as on one or more non-illustrated physical servers 430 that have available resource capacity to do so. However, in some embodiments the user may specify that keeping licenses available is to be prioritized over the cost of keeping hosts in the host resource group—in this case, the defragmentation service 140 may select only the instances of physical server 430A to be migrated, e.g., based on it having comparatively less time remaining for its license compared to physical server 430N.

As reflected above, these factors may or may not be a sole factor in determining which hosts are to be released via instance migration. For example, in some embodiments the defragmentation service 140 may obtain predictions (e.g., via a forecasting service, machine learning or statistical models, etc.) of which physical servers would likely be (and/or would not likely be) the target of instance launches and/or terminations over a future period of time. Thus, in some embodiments, a sole factor or one factor in the determination may be a likelihood of the host becoming more utilized in the future (leading toward wanting to keep the host around) or less/similarly utilized in the future (leading toward wanting to remove the host, when possible).

When the determination is made, the instances may again be migrated as described above and shown in FIG. 5, where the inter-dedicated host defragmentation 550 process results in the two small instances being moved to two small slots of the physical server 430N while the medium instances is moved to a newly-formed medium slot (from two small slots) of physical server 430N. Thereafter, the physical server 430A may be released 555 from the host resource group 400, making it potentially available for other uses or users of the provider network and removing its association and/or cost associated with the host resource group 400.

As described above, the LMS 105 may maintain a data structure tracking licenses for use in the provider network. In some embodiments, when a physical server is released from a host group but still has an associated license having time left (e.g., a validity time, or a server validity time), the license may be used—or attempted to be used—for future instance launches. By way of example, with reference to FIG. 5, if physical server 430A is removed from the host group but still has a host-associated license that is valid for additional time (e.g., fifteen days), if additional instance launches occur that require the host resource group 400 to add one or more additional host physical servers, the LMS 105 may seek to obtain hosts (e.g., from an available host pool) for these launches that have a currently-valid license of the user associated therewith, which may beneficially allow users to recontinue use of previously-released licenses, simplifying management and reducing cost.

In some embodiments, prior to performing an auto-migration and host release, the LMS 105 may notify the associated user (before the migration, or after the migration) and/or seek input or confirmation from the user whether to proceed with the migration. For example, the LMS 105 may send an electronic message (e.g., a console message, an email, a text message or other push notification, etc.) informing the user of a proposed defragmentation plan, and possibly seek confirmation (or a denial) of the plan before proceeding. This notification could beneficially present, to the user, information allowing them to make an informed decision as to whether/how the migration would be beneficial—e.g., a cost breakdown of savings under the status quo compared to the result of the defragmentation plan.

Figure 6:
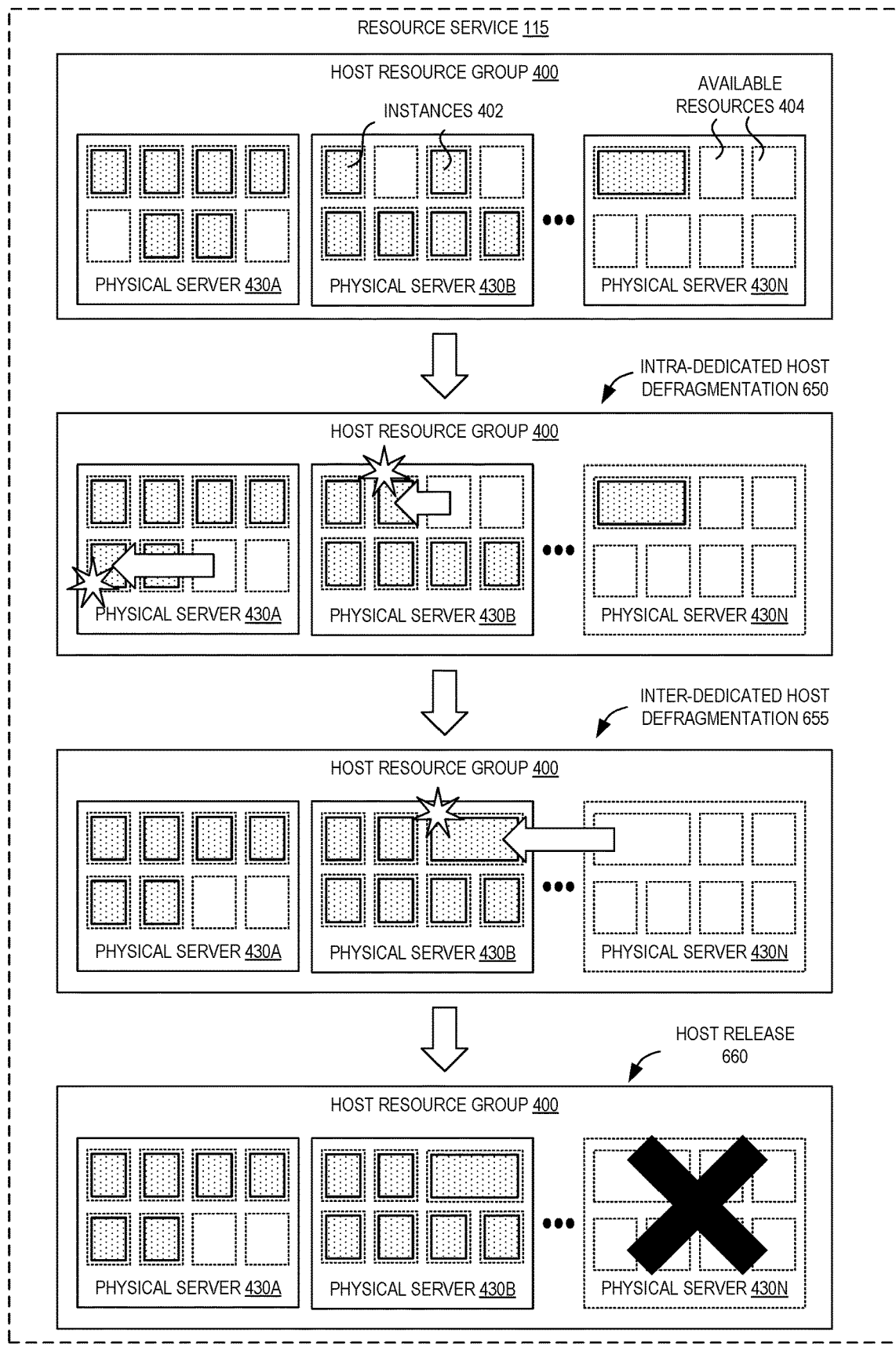
FIG. 6 is a diagram illustrating exemplary fragmentation of resource instances deployed to dedicated hosts in a host resource group and an exemplary combined intra- and inter-dedicated host defragmentation with host release according to some embodiments.

In addition to the inter-dedicated host defragmentation analysis and techniques disclosed above, in some embodiments the defragmentation service 140 can also or alternatively perform intra-dedicated host defragmentation analysis and techniques. For example, FIG. 6 is a diagram illustrating exemplary fragmentation of resource instances deployed to dedicated hosts in a host resource group and an exemplary combined intra- and inter-dedicated host defragmentation with host release according to some embodiments. In this example, a physical server 430N may be running a single medium instance and this physical server 430N may meet a set of fragmentation conditions indicating that the host physical server 430N is to be evacuated of instances and released.

In this example, we assume that two physical servers 430A/430B exist with available capacity. However, these physical servers 430A/430B may have capacity slots that would not be well-suited for use (or even usable) by a medium instance—e.g., the slots may be non-continuous and/or cross architectural boundaries (e.g., across sockets or NUMA nodes) and result in poor performance. Accordingly, in some embodiments the defragmentation service 140 can detect intra-dedicated host fragmentation (e.g., the ability to move around instances to different locations of the same host) that, when defragmented, could lead to the creation of contiguous resource slots, and/or larger sized slots available for running larger instances. This detection may occur at various points of time, e.g., upon a trigger (such as determining that inter-dedicated host fragmentation exists) or simply according to a schedule or on-demand (e.g., to maintain contiguous resource availability).

As shown in FIG. 6, the defragmentation service 140 may identify one physical server (e.g., physical server 430B) or multiple physical servers in the host resource group 400

(e.g., physical servers 430A/430B) that have intra-dedicated host fragmentation by for example, detecting that multiple available slots of the server are not contiguous. The defragmentation service 140 can perform an intra-dedicated host defragmentation 650 by moving instances from source locations on those hosts to destination locations on those hosts—here, one small-sized instance of each of physical servers 430A/430B is moved to a different location on the same server device. This results in the creation of a larger slot of contiguous resources being made available. The defragmentation service 140 may continue by performing an inter-dedicated host defragmentation 655 process, as described above, by selecting a destination (e.g., physical server 430B), according to any of the techniques disclosed herein, for the medium instance from physical server 430N and causing it to be migrated accordingly. Thereafter, the physical server 430N can be released from the host resource group 400 for other use per host release 660.

Figure 7:
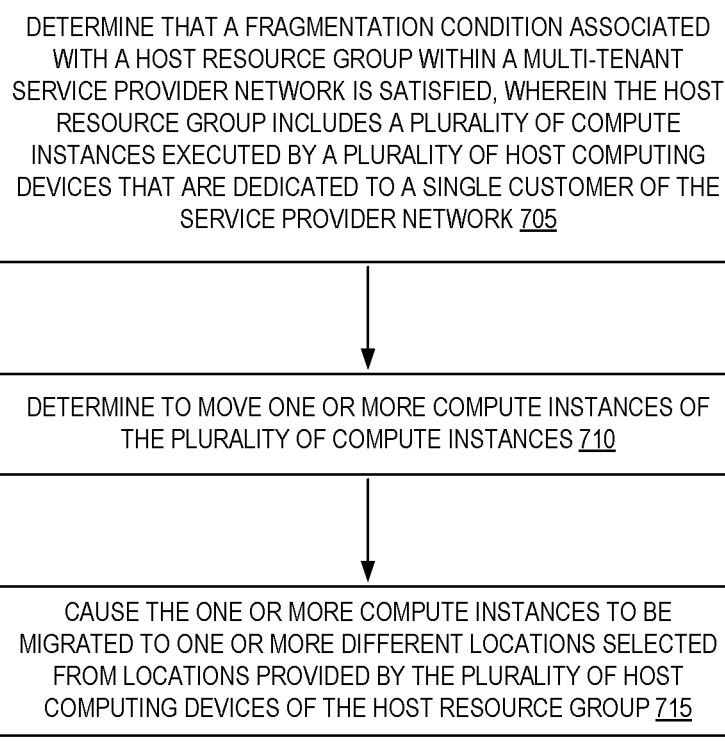
FIG. 7 is a flow diagram illustrating operations of a method for automated defragmentation of licensed resources in a provider network according to some embodiments.

FIG. 7 is a flow diagram illustrating operations of a method for automated defragmentation of licensed resources in a provider network according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by LMS 105 (e.g., the defragmentation service 140 component thereof) shown in the other figures.

The operations 700 include, at block 705, determining that a fragmentation condition associated with a host resource group within a multi-tenant service provider network is satisfied, wherein the host resource group includes a plurality of compute instances executed by a plurality of host computing devices that are dedicated to a single customer of the service provider network.

In some embodiments, determining that the fragmentation condition is satisfied includes determining that a resource utilization of a first host computing device from the host resource group is less than a threshold. In some embodiments, determining that the fragmentation condition is satisfied further includes determining that sufficient available resource capacity exists within the host resource group to execute the one or more compute instances.

The operations 700 further include, at block 710, determining to move one or more compute instances of the plurality of compute instances. In some embodiments, determining to move one or more compute instances of the plurality of compute instances includes: determining a license affinity amount of time remaining for a host computing device, of the plurality of host computing devices, that runs the one or more instances; and selecting the one or more compute instances based at least in part on an analysis utilizing the license affinity amount of time remaining In some embodiments, determining to move one or more compute instances of the plurality of compute instances includes: transmitting, over one or more networks, a first message destined to a computing device of a user associated with the customer, the first message identifying the one or more compute instances as candidates to be migrated; and receiving, over one or more networks, a second message originated by the computing device indicating that the one or more compute instances are to be migrated.

The operations 700 further include, at block 715, causing the one or more compute instances to be migrated to one or more different locations selected from locations provided by the plurality of host computing devices of the host resource group.

In some embodiments, the one or more compute instances are migrated to one or more different locations via a live migration technique, the live migration technique including at least: launching a new compute instance at one of the one or more different locations; copying at least a portion of a random-access memory (RAM) of one of the one or more compute instances to the new compute instance; and enabling the new compute instance in place of the one compute instance.

In some embodiments, the operations 700 further include removing a first host computing device from the host resource group, wherein the first host computing device executed the one or more compute instances prior to the one or more computing instances being migrated to the one or more different locations.

In some embodiments, prior to the migrating, a first host computing device from the host resource group executed the one or more compute instances at one or more initial locations; and after the migrating, the first host computing device executed another one or more compute instances corresponding to the one or more compute instances at the one or more different locations.

In some embodiments, the operations 700 further include receiving, over one or more networks, a request originated by a computing device of a user associated with the customer, the request indicating that defragmentation is to be enabled for the host resource group. In some embodiments, the request further includes a value selected by the user, wherein the determining that the fragmentation condition associated with the host resource group is satisfied is based at least in part on the value. In some embodiments, the value is one of: a threshold utilization of a host computing device that indicates whether instances executed by the host computing device should be migrated; a preferred level indicating how readily a host computing device in the host resource group with an active license may be released; or an indication of how strongly active licenses associated with host computing devices of the host resource group should be preserved.

Figure 8:
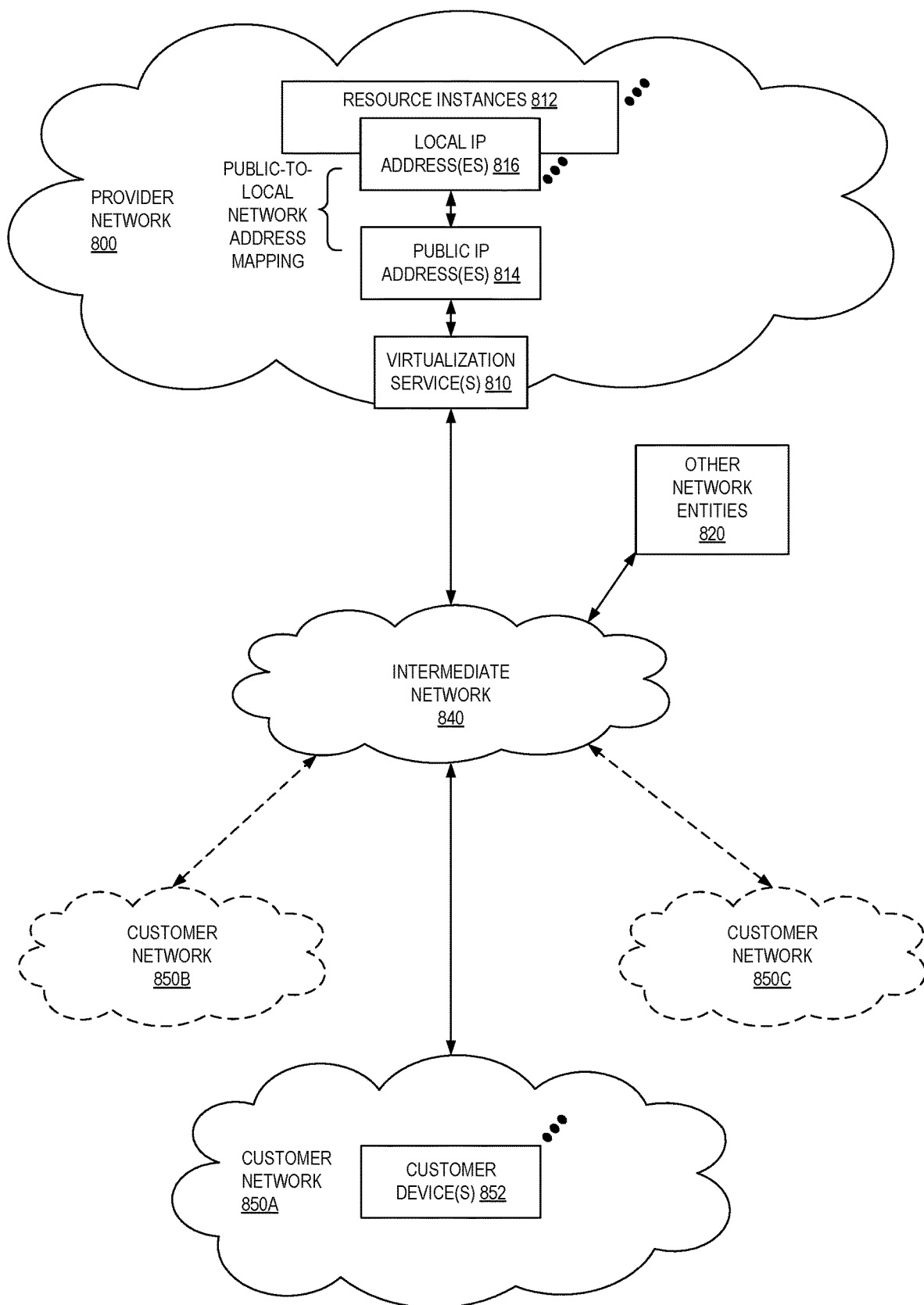
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
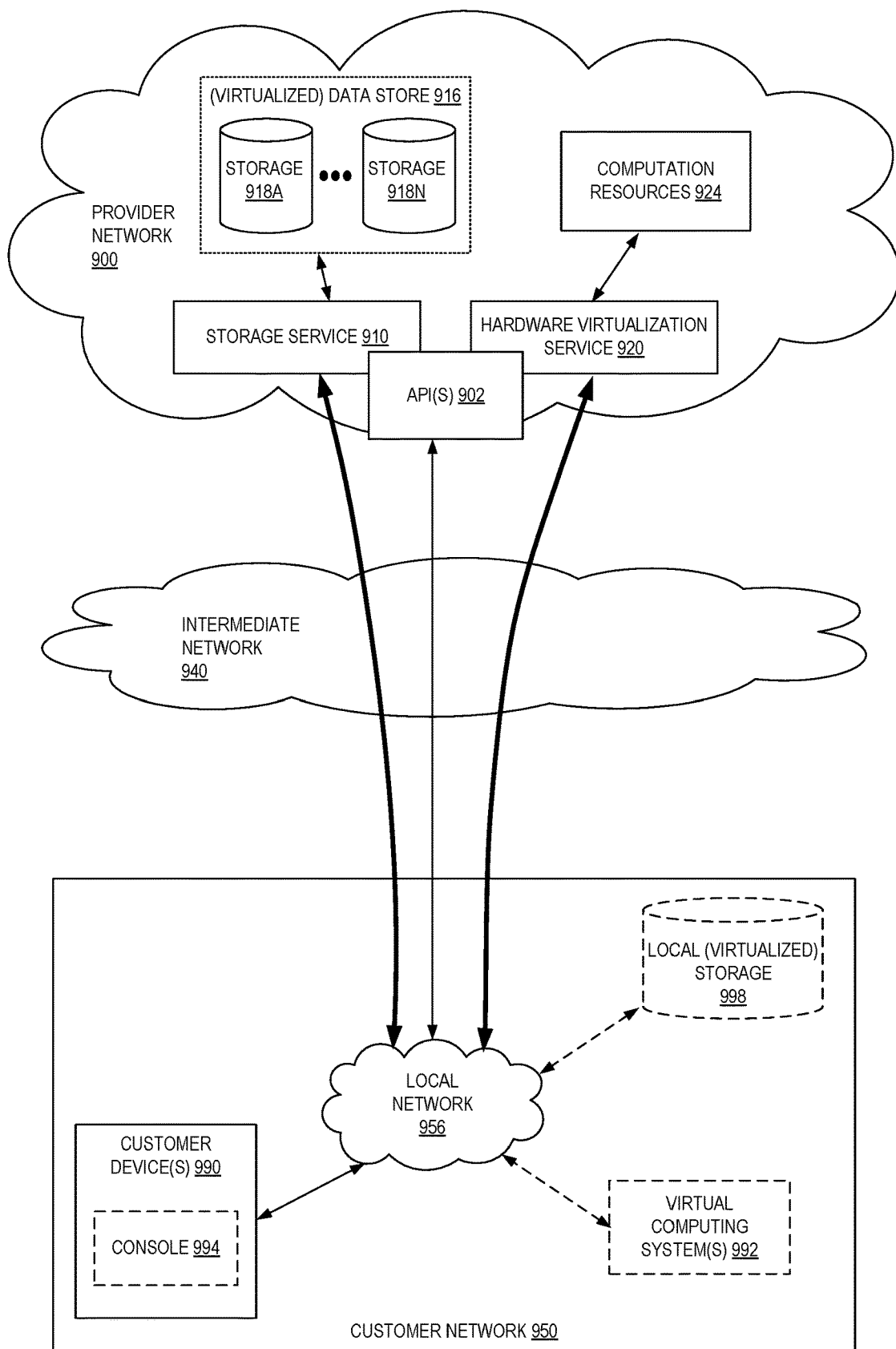
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
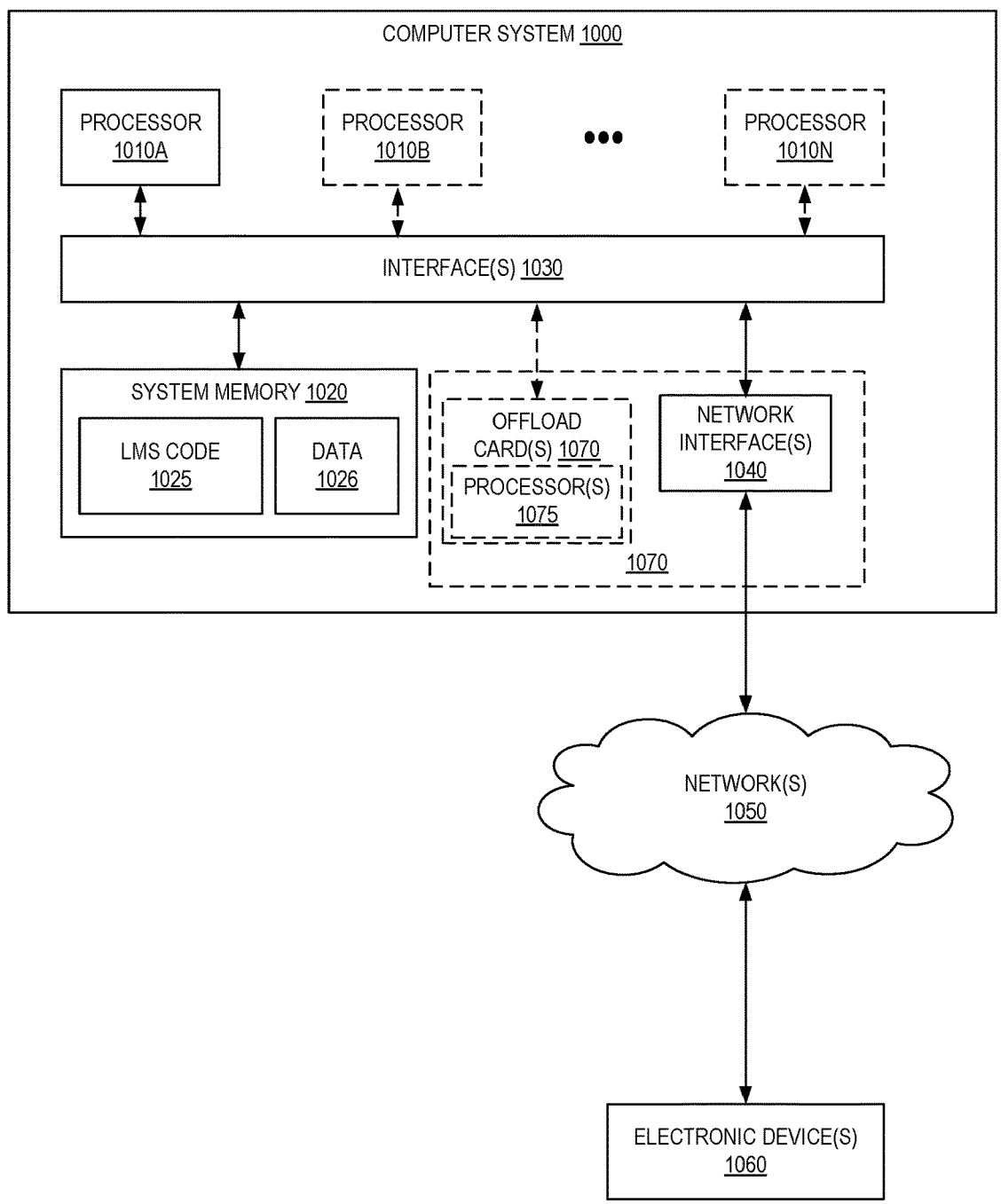
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as license manager service code 1025 (e.g., executable to implement, in whole or in part, the license manager service 105) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    creating, by a license manager service of a multi-tenant service provider network, a host resource group within the multi-tenant service provider network, the host resource group including a plurality of host computing devices at least partially managed by a hardware virtualization service of the multi-tenant service provider network, that are dedicated to a single customer of the service provider network for use in launching compute instances via the hardware virtualization service and are unavailable to other customers for use in launching compute instances;
    determining, by the license manager service, that a fragmentation condition associated with the host resource group is satisfied based at least in part on determining that a first compute instance executed by a first host computing device in the host resource group could be moved to a different slot location of a second host computing device in the host resource group to allow the first host computing device to be removed from the host resource group;
    causing, by the license manager service, the first compute instance to be migrated from the first host computing device to the different slot location of the second host computing device; and
    removing, by the license manager service, the first host computing device from the host resource group.

2. The computer-implemented method of claim 1, wherein determining that the fragmentation condition is satisfied comprises:
    determining that a resource utilization of the first host computing device is less than a threshold.

3. The computer-implemented method of claim 2, wherein determining that the fragmentation condition is satisfied further comprises:
    determining that sufficient available resource capacity exists within the host resource group to execute the first compute instance.

4. The computer-implemented method of claim 1, wherein the first compute instance is migrated to the different slot location via a live migration technique, the live migration technique including at least:
    launching a new compute instance at the different slot location;
    copying at least a portion of a random-access memory (RAM) of the first compute instance to the new compute instance; and
    enabling the new compute instance in place of the first compute instance.

5. The computer-implemented method of claim 1, wherein determining that the first compute instance could be moved includes:
    determining a first license affinity amount of time remaining for the first host computing device;
    determining a second license affinity amount of time remaining for a third host computing device in the host resource group; and
    selecting the first compute instance based at least in part on a determination that the first license affinity amount of time is less than the second license affinity amount of time.

6. The computer-implemented method of claim 1, further comprising:
    receiving, over one or more networks, a request originated by a computing device of a user associated with the customer, the request indicating that defragmentation is to be enabled for the host resource group.

7. The computer-implemented method of claim 6, wherein the request further includes a value selected by the user, wherein the determining that the fragmentation condition associated with the host resource group is satisfied is based at least in part on the value.

8. The computer-implemented method of claim 7, wherein the value is one of:
    a threshold utilization of a host computing device that indicates whether instances executed by the host computing device should be migrated;
    a preferred level indicating how readily a host computing device in the host resource group with an active license may be released; or
    an indication of how strongly active licenses associated with host computing devices of the host resource group should be preserved.

9. The computer-implemented method of claim 1, further comprising:
    transmitting, over one or more networks, a first message destined to a computing device associated with the customer, the first message identifying the first compute instance as a candidate to be migrated; and
    receiving a second message originated by the computing device confirming that the first compute instance is to be migrated.

10. The computer-implemented method of claim 1, further comprising:
    receiving a request to associate a license configuration with the host resource group; and
    associating the license configuration with the host resource group,
    wherein determining that the first compute instance could be moved is based at least in part on the license configuration.

11. The computer-implemented method of claim 10, wherein the license configuration is associated with licenses that are consumed on a per-host computing device basis.

12. The computer-implemented method of claim 1, further comprising:
    prior to the removing of the first host computing device from the host resource group, causing a second compute instance executed by the first host computing device to be migrated from the first host computing device to another different slot location of a third host computing device.

13. The computer-implemented method of claim 1, further comprising:
selecting the second host computing device to be a destination for the migrated first compute instance based on an analysis of one or more user-specified placement constraints.

14. A system comprising:
a first one or more electronic devices to implement a hardware virtualization service in a multi-tenant service provider network, the hardware virtualization service to run compute instances on behalf of users of the service provider network on host computing devices; and
a second one or more electronic devices to implement a license manager service in the service provider network, the license manager service including instructions that upon execution cause the license manager service to:
create a host resource group within the multi-tenant service provider network, the host resource group including a plurality of host computing devices at least partially managed by the hardware virtualization service that are dedicated to a single customer of the service provider network for use in launching compute instances and are unavailable to other customers for use in launching compute instances;
determine that a fragmentation condition associated with the host resource group is satisfied based at least in part on a determination that a first compute instance executed by a first host computing device in the host resource group could be moved to a different slot location of a second host computing device in the host resource group to allow the first host computing device to be removed from the host resource group;
cause the first compute instance to be migrated from the first host computing device to the different slot location of the second host computing device; and
remove the first host computing device from the host resource group.

15. The system of claim 14, wherein to determine that the fragmentation condition is satisfied, the license manager service is further to:
determine that a resource utilization of the first host computing device from the host resource group is less than a threshold.

16. The system of claim 14, wherein to determine that the first compute instance could be moved the license manager service is further to:
determine a first license affinity amount of time remaining for the first host computing device;
determining a second license affinity amount of time remaining for a third host computing device in the host resource group; and
select the first compute instance based at least in part on the first license affinity amount of time being less than the second license affinity amount of time.

17. The system of claim 14, wherein the license manager service further includes instructions that upon execution cause the license manager service to:
receive, over one or more networks, a request originated by a computing device of a user associated with the customer, the request indicating that defragmentation is to be enabled for the host resource group, wherein the request includes a value selected by the user, and
wherein the license manager service is to determine that the fragmentation condition associated with the host resource group is satisfied based at least in part on the value.

18. The system of claim 14, wherein the license manager service is further to:
receive a request to associate a license configuration with the host resource group; and
associate the license configuration with the host resource group,
wherein the determination that the first compute instance could be moved is based at least in part on the license configuration.

19. The system of claim 18, wherein the license configuration is associated with licenses that are consumed on a per-host computing device basis.

20. The system of claim 14, wherein the license manager service is further to:
prior to the removal of the first host computing device from the host resource group, cause a second compute instance executed by the first host computing device to be migrated from the first host computing device to another different slot location of a third host computing device.

* * * * *